United States Patent [19]

Rohmer et al.

[11] Patent Number: 4,630,341
[45] Date of Patent: Dec. 23, 1986

[54] APPARATUS FOR THE INTRODUCTION OF A PIECE INTO A SEAT IN AN OBJECT

[75] Inventors: Daniel Rohmer, Herrlisheim; Alain Scherrer, Pfastatt, both of France

[73] Assignee: Manufacture de Machines du Haut-Rhin, Mulhouse, France

[21] Appl. No.: 564,093

[22] Filed: Dec. 21, 1983

[30] Foreign Application Priority Data

Dec. 22, 1982 [FR] France .................. 82 21557

[51] Int. Cl.$^4$ .................. B21D 51/54; F42B 7/02
[52] U.S. Cl. .................. 29/1.3; 86/12
[58] Field of Search .......... 29/234, 235, 240, 1.3–1.32; 86/12

[56] References Cited

U.S. PATENT DOCUMENTS

| | | | |
|---|---|---|---|
| 1,066,980 | 7/1913 | Bailey | 86/12 |
| 2,514,946 | 7/1950 | Gagne | 86/12 |
| 2,715,962 | 8/1955 | Messinger | 86/12 |
| 3,446,101 | 5/1969 | McKay | 29/240 |
| 3,691,619 | 9/1972 | Stack et al. | 29/234 |
| 4,295,260 | 10/1981 | Divers | 29/234 |
| 4,498,234 | 2/1985 | Greslin et al. | 29/1.3 |

Primary Examiner—Howard N. Goldberg
Assistant Examiner—Steven Nichols

[57] ABSTRACT

Method of and apparatus for the manipulation of workpieces particularly in continuous travel, such as the introduction of a workpiece into a seat in an object. The invention utilizes a vehicle formed of an outer body in the interior of which there is disposed a tubular lining which is guided for longitudinal movement with respect to the body, the lining being adapted to receive a workpiece therewithin. The workpiece is introduced into the seat in the object while maintaining the object with its longitudinal axis coincident with the axis of the body of the vehicle by thrusting the object within the body of the vehicle so as to displace the lining of the vehicle from such body and until the seat in the object receives the worked piece. There is thus assured a relative centering of the workpiece with respect to the seat in the object and, in avoiding the movement of the workpiece one avoids problems of achieving alignment between the seat in the object and the workpiece while the apparatus is working at high speed in continuous motion. The invention finds one of its most important fields of application in the applying of percussion caps to the cartridge cases for ammunition.

10 Claims, 19 Drawing Figures

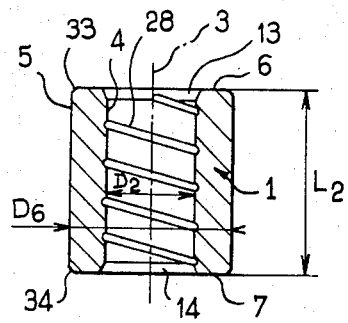
FIG_1
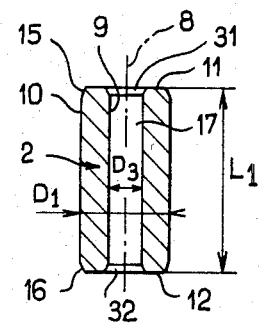
FIG_2
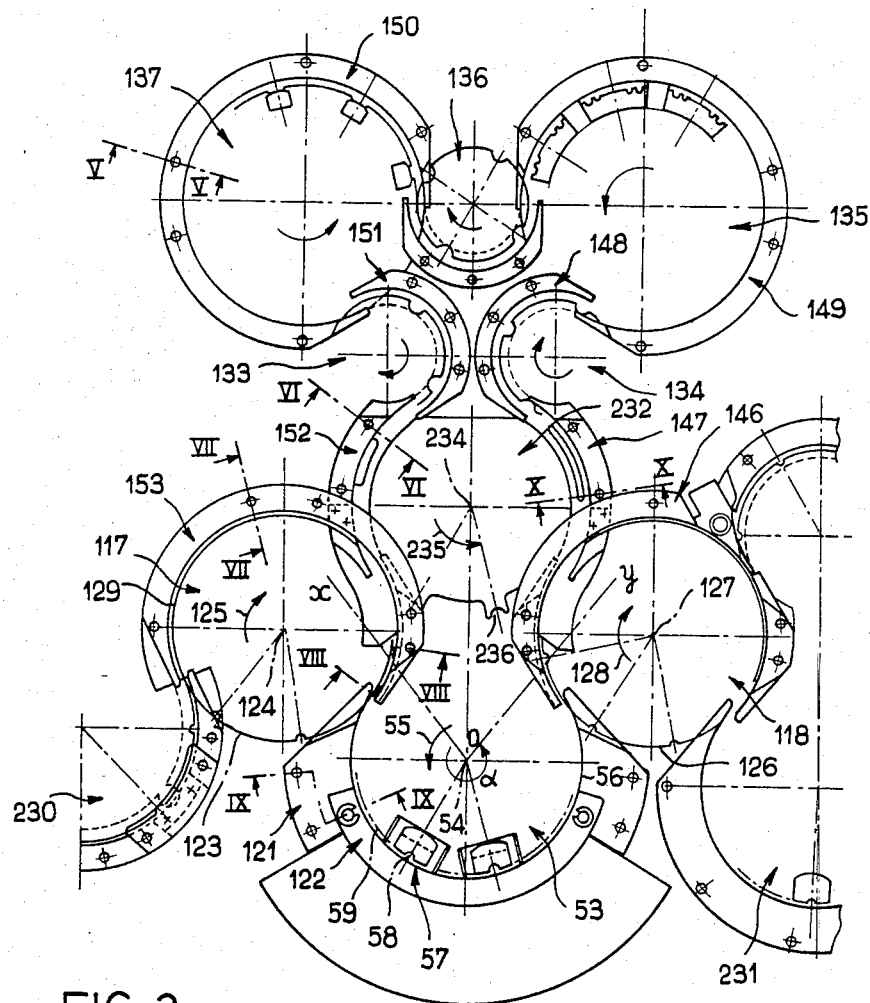
FIG_3

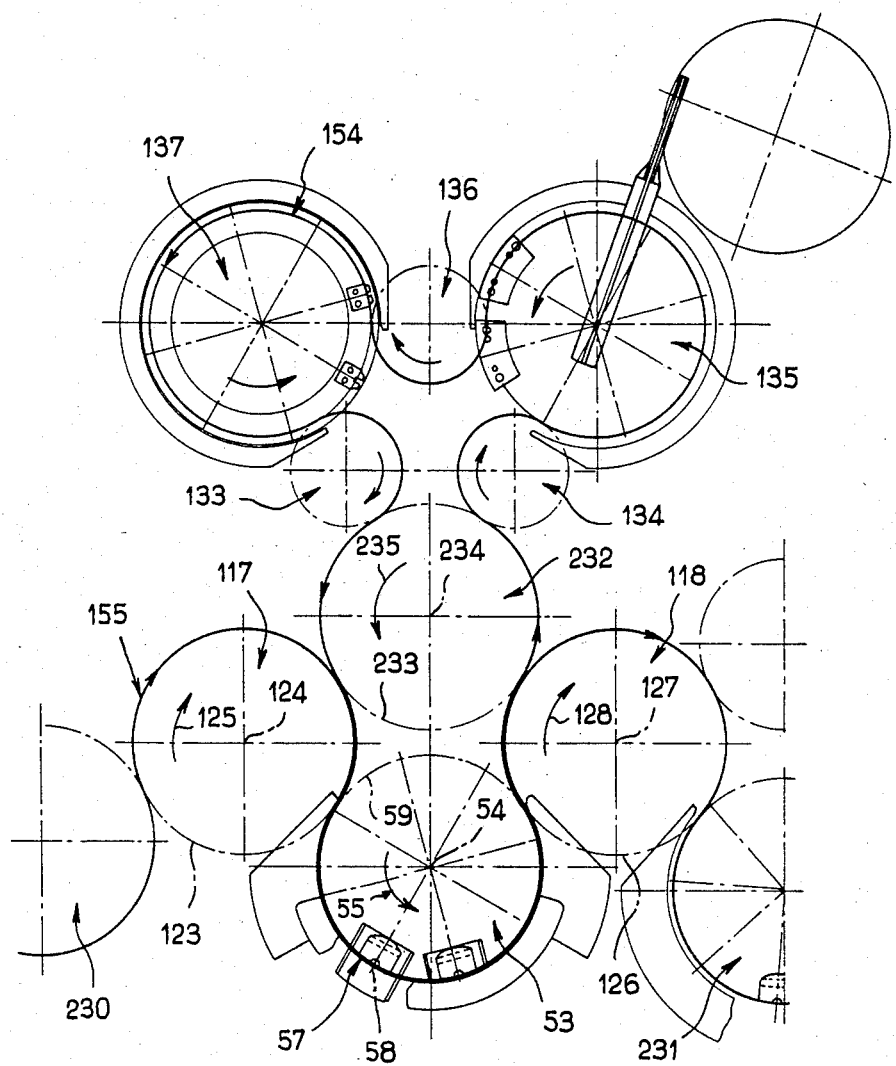
FIG_4

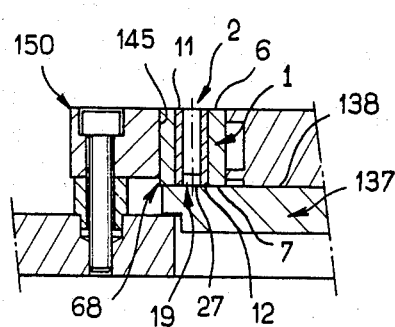
FIG_5
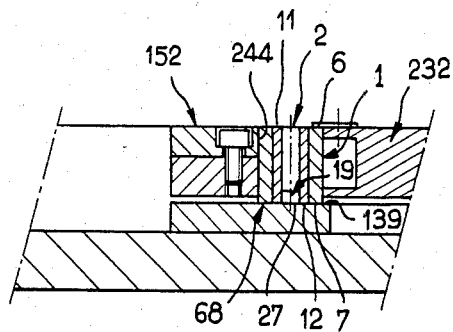
FIG_6
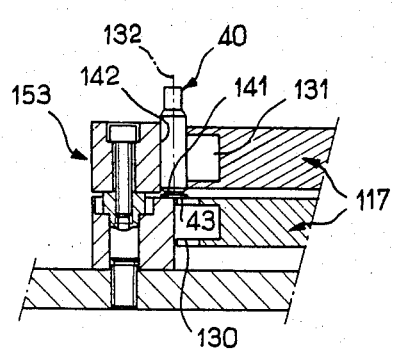
FIG_7
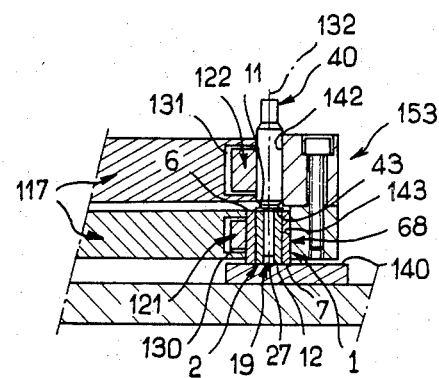
FIG_8
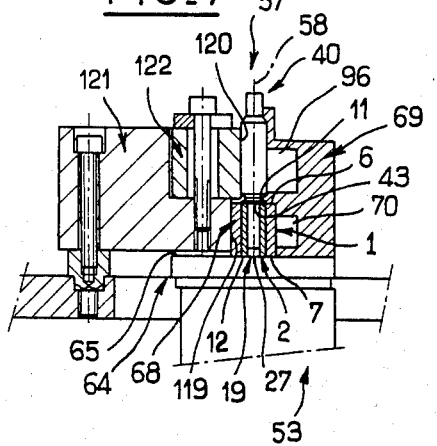
FIG_9
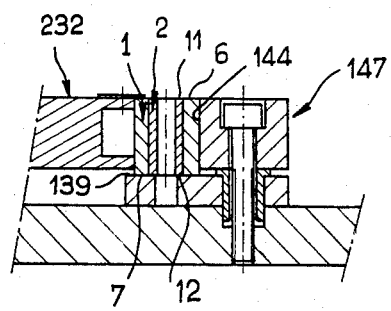
FIG_10

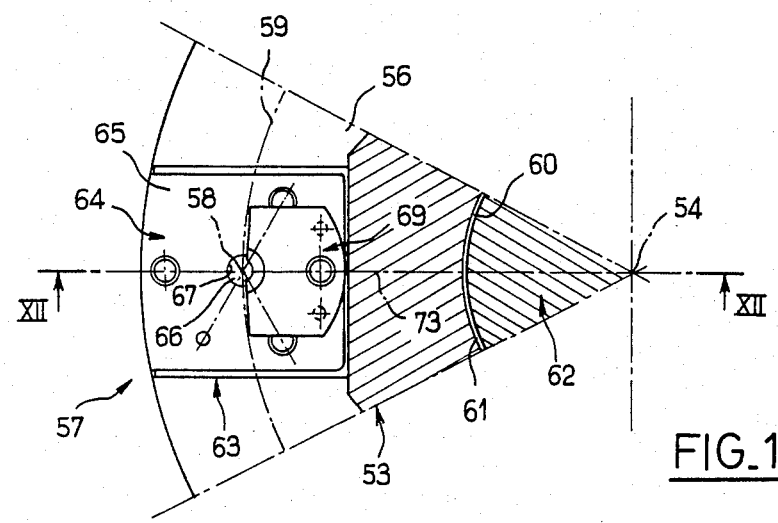
FIG_11
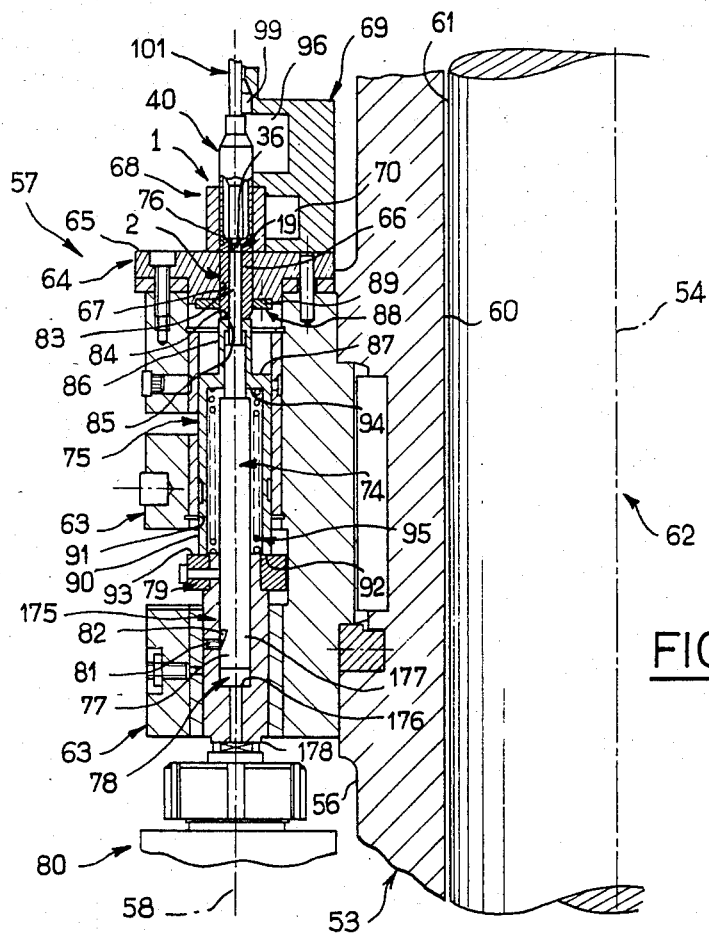
FIG_13

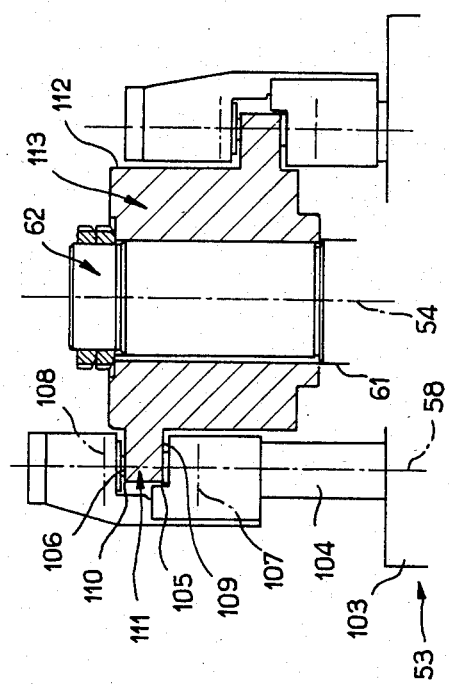
FIG_14
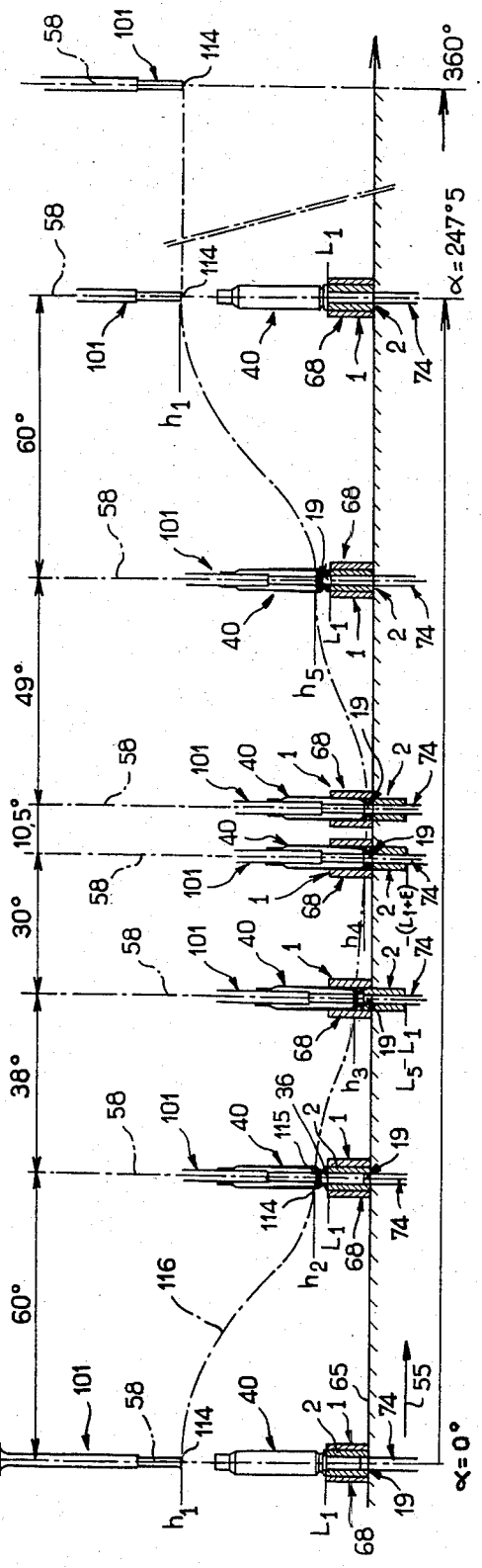
FIG_15

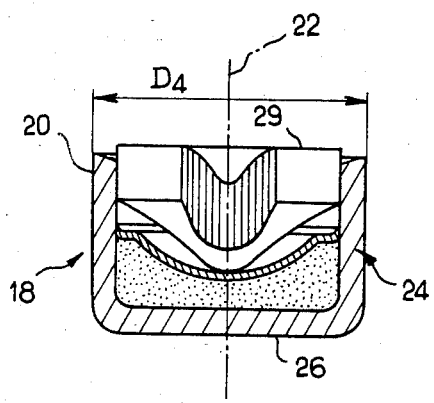
FIG_16
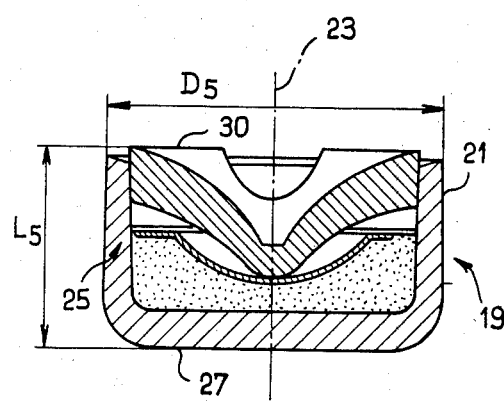
FIG_18
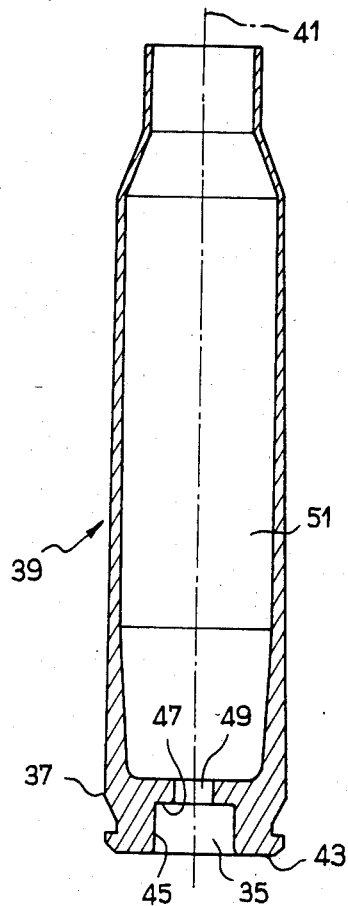
FIG_17
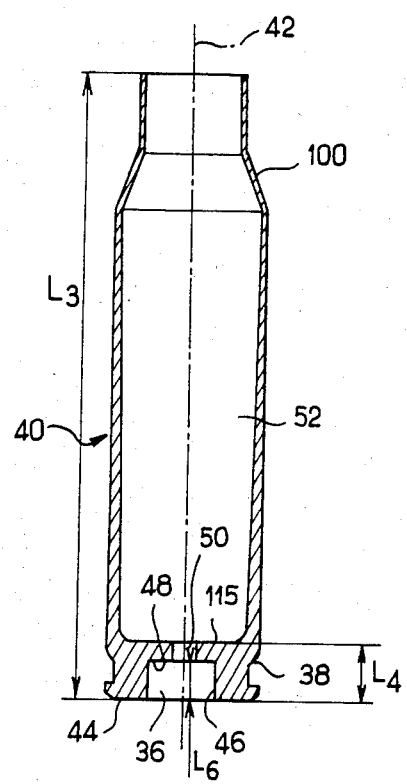
FIG_19

APPARATUS FOR THE INTRODUCTION OF A PIECE INTO A SEAT IN AN OBJECT

The present invention concerns the manipulation of pieces, and more particularly the continuous manipulation of pieces of small height which must be maintained in a predetermined orientation during such manipulation, in view of their presentation at a treating or assembling station.

An example of such pieces is the percussion caps of munitions in which it is important to present them to an assembly station in the respective sleeves or seats of shell casings according to a precise orientation which is necessary to perform such assembly without the risk of incurring accidents.

To carry out the manipulation of such pieces, one can place them provisionally in a means which may be called a "vehicle", constituted by a rigid block, made for example of metal, having a generally rectilinear opening therein with a transverse section which is generally constant along the longitudinal axis thereof, such opening following a predetermined orientation with respect to such axis, the vehicle being held in a predetermined position with respect to such axis during the assembly manipulations, and finally assembling the piece in the seat while having conserved such orientation.

Such manipulations are particularly carried out while feeding a work station with such pieces while the station is continuously in motion.

It should however be observed, that if it is thus possible to conserve a fixed orientation of each piece during its manipulation, the vehicle is unsuitable to assure the maintenance of the piece in such orientation when the piece is discharged from the opening in the vehicle at the work station.

Thus, if one refers to the introduction of percussion caps into the seats therefor in cartridge cases, one can envisage the utilization of such vehicles for practicing the manipulation of percussion caps, in order to maintain them in a perfect predetermined orientation during all of the manipulation, but the correct passage of the percussion cap to its seat in the cartridge case in the assembly or arming station is not assured, since it requires a perfect coincidence between the respective axes of the opening in the vehicle, which temporarily contains the percussion cap, and the axis of the seat provided in the cartridge case to receive such percussion cap.

But, because of the small dimensions and proportions of the percussion caps, the least imprecision in the alignment of the opening in the vehicle and the seat in the cartridge case can give rise, in the travel of the cap to the seat, in a zone in which the guiding of the percussion cap, because of the fact that the guiding is discontinuous, to a misalignment with the percussion cap, thereby resulting in the danger of an explosion.

As a consequence, up to the present, there has been no use of vehicles for manipulation of percussion caps to transport them to the arming station, or, more generally, for the manipulation of pieces which are vulnerable to misalignment with respect to objects with which they are to be assembled; this totally excludes the treatment of such pieces in continuously moving mechanisms.

For example, to introduce percussion caps in their seats in cartridge cases, up to the present there has been utilized a procedure involving the feeding of the cartridge cases one-by-one under a transfer press under which the percussion caps, placed for example in a hopper, are led one-by-one in a system in which they slide; when the cartridge case arrives under the press, the feeding of the cartridge cases is interrupted and the press introduces a percussion cap, fed during such time by the conveyor, in the seat of the then stopped cartridge case; the line of cartridge cases then advances one step, that is to say the distance between two successive cartridge cases, and the operation is repeated.

Such technique permits the assurance of a relatively precise positioning of the percussion caps with respect to their seats at their introduction thereinto, but has the inconvenience of the relative slowness of the operation by reason of the mechanical necessities of it; integrated in a manufacturing chain working in a system which continually moves, it prevents the use of such technique involving the use of a continually moving mechanism to the full extent of its possibilities.

The object of the present invention is to make possible the use of the continually moving mechanism technique in manipulating such pieces, by providing a vehicle which not only is adapted to maintain the pieces in a predetermined orientation during their manipulation, but which equally is adapted to permit manipulation, that is, the introduction of an object into an appropriate seat, under the same conditions of security while conserving a predetermined orientation thereof.

For this purpose, the present invention provides a vehicle of the type incorporating an opening presenting a rectilinear axis and a section which is constant in a direction transverse to such axis to receive interiorally thereof a piece in view of its manipulation and of its following assembly, characterized in that it comprises at least one lining defining the opening and an external body for the lining and with respect to which the lining is mounted with the possibility of its translation in a direction parallel to the axis of such opening.

Notably, in the case of the manipulation of percussion caps, such vehicle may advantageously be utilized as a part of the apparatus described in coassigned U.S. patent application of Greslin et al, Ser. No. 459,681, filed Jan. 20, 1983, which permits the introduction of pieces into vehicles so that one piece is deposited into the opening in each vehicle, the body of the lining of such vehicle being vertical and retained in opposition to a sliding conveyor relative to a support toward the bottom and toward the top against respective parts of the machine designated 75 and 83, respectively, in the above referred-to Greslin et al application.

During the manipulation of the vehicle enclosing the piece, the piece may be maintained in the interior of the opening in the vehicle by friction, by reason of an appropriate choice of the dimensions of the opening as a function of those of the piece, or, more advantageously, by abutments assuring the retention of the lining in the interior of the body, the piece being then mounted for free sliding, but with a tight fit, in the interior of the opening of the vehicle.

Advantageously, the lining and the body are defined, transversely with respect to the axis, by two respective end faces perpendicular to the axis, and the respective lengths of the body and the lining, measured between their respective end faces, parallel to axis, are equal in such manner that, in a relative translation parallel to the aixs, the lining and the body can be led in a desired manner in which their respective end faces are coplanar with respect to each other, which defines the state of the vehicle during which a piece is introduced into the opening therein and during the manipulation thereof.

According to a construction of the vehicle which is particularly simple, the lining is tubular and presents a peripheral internal face defining the opening and an external peripheral face of constant section transverse to the axis, and the body presents an internal peripheral face having a transverse section which is constant with respect to the axis and complementary to the exterior peripheral face of the lining to assure by a mutual gliding contact the possibility of relative translation of the body with respect to the lining, in a preferred embodiment the lining is engaged to a maximum within the body, and their respective end faces are coplanar one with respect to the other if one adopts the preferred construction referred to above.

Then, the vehicle can be employed in a particularly advantageous manner to introduce a piece into a seat of an object, said seat presenting a predetermined axis and the object presenting in the zone thereof surrounding the seat an external envelope the generatrices of which are parallel to such predetermined axis, by a procedure consisting of introducing and retaining the piece in the opening in the vehicle, of coupling the vehicle and the object in a relative position in which the respective axes of the seat and the space coincide and in which the seat is aligned with the space, of transferring the piece from the space to the seat by a relative translation of the piece and the space following the axis of the space, and of separating the vehicle and the object; according to the present invention, such method is characterized in that one selects a vehicle the body of which presents an interior peripheral face of which the section transverse to the axis is complementary to the said envelope of the object and, after having introduced and retained the piece in the space in the vehicle, one couples the vehicle and the object in such relative position by the lining of the vehicle into the preferred state, in which the transfer of a part is effected while causing the translation of the body with respect to the lining resting so it is coupled to the object, in order to envelope it by means of the body while allowing it equally to be engaged upon the lining (operation a), and on the other part by pushing the piece into the seat (operation b), and causing the return of the vehicle into said preferred initial state before separating the object from it.

Advantageously, in order to facilitate the operations, the internal peripheral face of the body and/or the external peripheral face of the lining present at least one chamferred end, disposed transverse with respect to the axis, and/or the interior peripheral space of the body and/or the external peripheral face of the lining presenting a helicoidal rifling.

Since the piece presents an external periphery which is a cylinder of revolution about an axis which coincides with the axis of the space when the piece is engaged in the interior thereof, and the angular position of the piece around its axis of introduction into the seat of the object is of no consequence, as is the case when it concerns the percussion cap of a cartridge, the internal and external faces, respectively, of the lining and of the body are cylinders of revolution around their axes, which makes possible a manipulation of the vehicle and a placement thereof in the axis of the seat in the object with a view to making such introduction particularly simple.

To practice such method, there is advantageously employed a mechanism comprising, in a work station, means to receive an object in such relative position and a vehicle of preferred construction in the space of which a piece is retained, and means to effect the transfer of the piece from such space to the seat by the translation of the piece in the space following the axis thereof, said mechanism in accordance with the invention being characterized in that the means for effecting the transfer comprises means to apply opposing thrusts along the axis of the space on the one hand to the object and the lining and on the other hand to the body and the piece, in the direction of the introduction of the object into the body and of the piece into the seat of the object during their preferred positioning, and for thereafter discharging the vehicle when in such preferred position.

Advantageously, the mechanism practices the above-discussed operations a and b while retaining the body of the vehicle and the piece in opposition to a movement notably following the axis of the space, and in sliding the lining with respect to the body and the piece along such axis, by a push applied by the intermediary of the object which one introduces into the thus retained body, by a relative translation following such axis, until the seat receives the piece.

By reason of the envelopment, by the body of the vehicle, of the zone of the object bordering the seat adapted to receive the piece during the introduction thereof into the seat, there is assured a relative centering of the seat and the space within the vehicle which is as accurate as possible, so as to introduce the piece into the seat under the best conditions possible; notably, according to the preferred method in accordance with the invention, after having introduced the piece into the space in the vehicle, one retains it in such space in proximity to one of its ends in order to couple the lining and the object in the proximity of the other end of the space with a view of carrying out the transfer of the piece to the seat in the object, whereby the centering of the seat in the object with respect to the space in the vehicle can be carried out successively, that is to say, with respect to the piece, then the introduction of the piece into the same seat if one carries out operations a and b simultaneously, particularly if one uses a vehicle the lining and the body of which present an identical length, measured parallel to the axis of the space between their respective end faces.

There follows a particularly simple manner of carrying out the method, and a rapid process of introduction of the piece in the seat, so as to permit the integration without inconvenience of such introduction, in a manner in accordance with the invention, in a fabrication chain also fed and served elsewhere by a continuously moving chain of apparatus.

Other characteristics and advantages of the invention will appear in the following description, relative to a non-limiting example of a manner of carrying out the invention, as well as the annexed drawings which form an integral part of such description.

The invention will be described by reference to the manipulation of percussion caps for cartridge cases and their introduction into complementary seats provided in the bottom of the cartridge shell, but the practice of the invention is not limited to such area, and one skilled in the art familiar with mechanisms which are to be described and which are illustrated can practice the invention in all its modifications appropriate to its use in other technical areas without departing from the framework of the invention.

In the drawings,

FIG. 1 is a view in longitudinal axial section through the body or outer part of a vehicle in accordance with the invention;

FIG. 2 is a view in longitudinal axial section, on the same scale as FIG. 1, of the lining for the vehicle;

FIG. 3 is a view partially in plan from above and partially in horizontal section of a percussion cap loading machine practicing the invention in the framework of a continuously moving chain of article transporting and article treating mechanisms;

FIG. 4 is a schematic view corresponding to FIG. 3 showing the respective paths of circulation of cartridge cases and vehicles;

Figure 12:
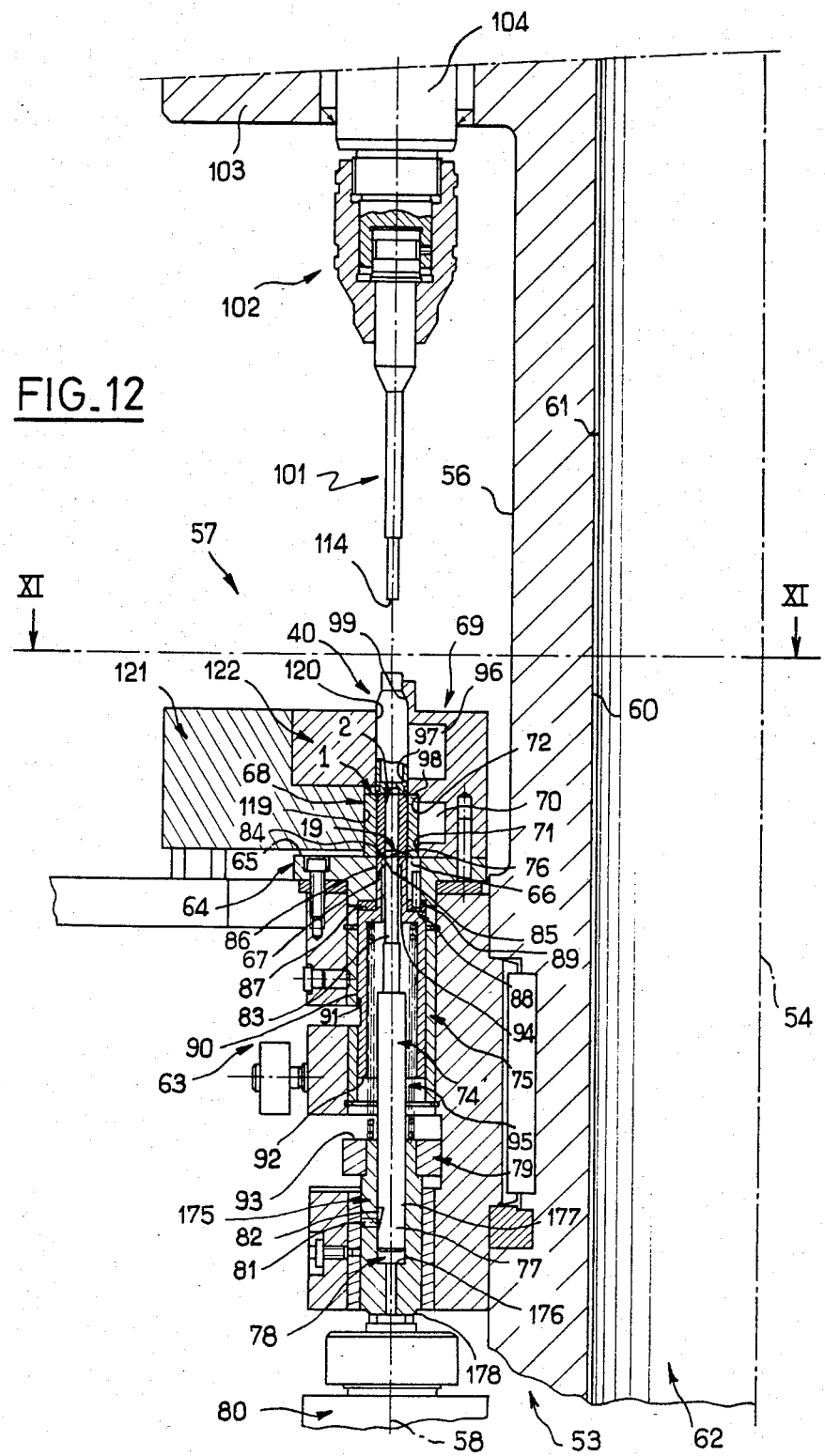

FIGS. 5 to 10, incl., show various sections taken through the mechanism of FIG. 3, such sections being taken, respectively, along the line V—V, VI—VI, VII—VII, VIII—VIII, IX—IX, and X—X;

FIG. 11 is a view in horizontal section, on a scale much larger than that of FIG. 12, of a station of the apparatus at which a percussion cap is applied to a cartridge case, the section being taken along the line XI—XI in FIG. 12;

FIG. 12 is a view in radial section through the apparatus of FIG. 11, the section being taken along the line XII—XII in FIG. 11, FIG. 12 illustrating a station wherein a percussion cap is applied to a cartridge case with the parts in the positions which they occupy immediately before the start of such process;

FIG. 13 is a view in radial section similar to that of FIG. 12 of a station at which a percussion cap is supplied to a cartridge case but with the parts in the positions which they occupy at the end of such process;

FIG. 14 is a view in longitudinal diametrical section through the cam which drives the means for applying percussion caps to the seats in the cartridge cases;

FIG. 15 is a view showing the development of the path of the cam shown in FIG. 14, FIG. 15 illustrating the different states of a station for applying a percussion cap to a cartridge case in the course of the rotation of the drum upon which such station is located around the cam;

FIGS. 16 and 17 are views in axial section on different scales of a percussion cap and a corresponding cartridge case, respectively; and FIGS. 18 and 19 are views in axial section, on different scales, of another percussion cap and the corresponding cartridge case, respectively.

Referring first to FIGS. 1 and 2, it can be seen that the vehicle is formed of a body 1 and a lining 2, members 1 and 2 both being tubular, independent, and separable.

Body 1 has a longitudinal axis 3, an interior peripheral face 4 and an exterior face 5, faces 4 and 5 being coaxial of the axis 3. Body 1 has end faces 6 and 7 disposed in planes transverse to axis 3; the outer edges of surfaces 6 and 7 are chamferred at 33 and 34, respectively with respect to the external peripheral surface 5. The lining 2 has a longitudinal axis 8 and an inner circular cylindrical surface 9, and an outer circular cylindrical surface 10, surfaces 9 and 10 being coaxial of axis 8. The lining 2 has end faces 11 and 12, said faces being chamferred inwardly at 31 and 32 with respect to surface 9 and outwardly at 15 and 16 with respect to surface 10. The outer end surfaces 11 and 12 are disposed in planes lying at right angles to the axis 8.

The external peripheral face 10 of the lining 2 and the internal peripheral face 4 of the body 1 are carefully polished and present respective diameters $D_1$ and and $D_2$ which are substantially equal, in such manner that the lining 2 may be engaged within the body 1 in a position in which their respective axes 8 and 3 coincide, and the faces 10 and 4 when placed in contact assure a guiding of members 1 and 2 relative to each other by reason of their mutual sliding, in a direction parallel to the coincident axes 8 and 3.

The above referred-to chamfers 13 and 14 of the body 1 and the chamfers 15 and 16 of the body 2 facilitate such movements, particularly the introduction of the lining 2 into the interior of the body 1. All of such chamfers or certain ones of each pair thereof may be omitted in other embodiments of the vehicle.

Finally, the interior peripheral face 4 of the body 1 is provided with a helicoidal groove or rifling 28 extending coaxially about the axis 3; the external peripheral face 10 of the lining 2 can equally be provided with rifling which is helicoidal about the axis 8; however, by preference the rifling or grooving 28 is then omitted.

According to the preferred embodiment of the vehicle which is illustrated, the faces 11 and 12 of the lining 2 are spaced, in a direction along the axis 8, through a distance $L_1$ (FIG. 2) which is equal to the distance $L_2$ (FIG. 1) of the body 1, measured parallel to the axis 3 between the faces 6 and 7. As a result of the relative travel of body 1 and lining 2 along the coincident axes 3, 8 thereof the end faces 11 and 12 of lining 2 may be made to lie coplanar with, respectively, the end faces 6 and 7 of body 1.

The lining 2 defines by its inner peripheral face 9 an opening bore 17 coaxial of the axis 8, space 17 being adapted to receive a percussion cap, for example of the type illustrated in FIG. 16, where it is designated 18, or of the type illustrated in FIG. 18, wherein it is designated 19.

In a manner known per se, the percussion caps 18 and 19, respectively, are defined externally by a peripheral external face 20 in FIG. 16 and 21 in FIG. 18 which form cylinders of revolution about axes 22 and 23, respectively, of cups 24 and 25, respectively, which have, respectively, bottom walls 26 and 27. Walls 26 and 27 are disposed in planes which lie transverse to the respective axes 22 and 23. The percussion cap 18 of FIG. 16 has another, transverse face 29 at the open end of the cup; cap 19 of FIG. 18 has a similar transverse face 30 at the open end of the cup. Surfaces 29 and 30 are partially closed by a yieldable element; naturally, the vehicle can be used for the manipulation of percussion caps of other types, presenting, for example, a bulging lower surface.

In order to receive a percussion cap such as that shown in either FIG. 16 or 18 in a position of coaxiality as perfect as possible, the space 17 (FIG. 2) within the lining 2 has a diameter $D_3$, defined by the diameter of the internal peripheral face 9 of the lining 2, which is also as close as possible to the diameter $D_4$ or $D_5$ of the peripheral external faces 20 and 21, respectively, of the caps 18 and 19. The diameter $D_3$ may be chosen, as a function of the diameter $D_4$ or $D_5$, in such manner as to insure an immobilization of the percussion cap 18 or 19 in the interior of the lining 2 by reason of friction of the surface 20 or 21, respectively of the caps against the internal face 9 of the lining. However, by preference, the face 9 is carefully polished, and presents a diameter $D_3$ greater by some hundreds of a millimeter than the diameter $D_4$ or $D_5$ so that the cap 18 or 19 is free for gliding parallel to the axis 8, with which its axis 21 or 22 is coincident, with respect to the lining 2, that is, with respect to the space 17 therewithin.

In order to facilitate the introduction of the percussion cap 18 or 19 into the bore or space 17 in the lining 2, the interior peripheral face 9 of such lining is advantageously connected to at least one of the end faces 11 and 12 thereof by the above-described chamfer, here provided in both ends where it is designated, respectively, by the reference characters 31 and 32 (FIG. 2).

It is to be noted that it is thus necessary to provide a lining presenting an interior diameter $D_3$ determined for each type of percussion cap to be carried in the vehicle; the diameters $D_1$, $D_2$ are determined by the cartridge cases to be provided with percussion caps, as will appear below. In any event, the diameter $D_6$ of the external peripheral face 5 of the body 1 can be identical with the diameters $D_3$ and $D_1$–$D_2$, which permits the utilization of standard means for transporting the vehicles, in the form of bodies 1 provided with linings 2, even with the introduction of percussion caps with different sizes in cartridge cases which themselves may be of different sizes.

The vehicle which will now be described is more particularly adapted, by the form of a cylinder of revolution of its interior and exterior faces of the body 1 and of the lining 2, to the manipulation of pieces which, such as percussion caps 18 and 19, do not necessarily require their fixed angular orientation with respect to their axes 22 and 23, that is to say, with respect to the axis 8 defining the axis of the space or bore 17. In accordance with the invention, the interior and exterior peripheral faces of the body 1 and of the lining 2 present transverse sections with respect to their respective axes 3 and 8 which are bodies of revolution around such axes, so that it is not necessary to associate each piece with a fixed angular orientation with reference to the coincident axes 3 and 8. Not only vis-a-vis the interior peripheral space 9 of the lining 2 defining the space 17, but equally vis-a-vis the external peripheral face 5 of the body 1, the vehicle 68 (FIGS. 5, 6) permits a manipulation of the assembly of vehicle and the piece contained in the space 17 while preserving a known orientation of the piece. Possibilities of relative translation of the body 1 and of the lining 2 with respect to the axis of the space 17 will be naturally preserved, for example, by virtue of a constant section, transversely respect to its with respective axis 3, 8, of the interior peripheral face 4 of the body 1 and of the exterior peripheral face 10 of the lining 2, the face 9 defining the space 17 presenting equally a constant transverse section with respect to the axis 8 so as to permit the gliding of the piece such as a percussion cap therewithin.

The choice of materials constituting, respectively, the body 1 and the lining 2 is within the domain of skill of one skilled in the art. As a non-limiting example, good results are obtained when the body is made of tempered steel (100C6 for rolling) for it to possess a good mechanical resistance and correct frictional characteristic, and for the lining to be made as a casting with spheroidal graphite (GS 600) compatible with the material of the body with respect to frictional characteristics.

A method for the introduction of a percussion cap 18 or 19 into a seat 35 or 36 at the collar 37 or 38 of a cartridge case 39 or 40 (FIGS. 17 and 19) by means of a vehicle 68 (FIGS. 5 and 6) resulting from the assembly of a body 1 and a lining 2 of the types shown in FIGS. 1 and 2, respectively, will now be described in connection with the mechanism which is particularly illustrated in FIGS. 3–15, inclusive.

With reference to FIGS. 17 and 19, which show two non-limiting examples of cartridge cases which are able to be thus provided with percussion caps, it is to be recalled that the seat 35 or 36 provided in the bottom 37 or 38 of a cartridge case 39 or 40 has an axis 41 or 42 opening in a plane annular face 43 or 44 of the bottom, oriented perpendicularly to the axis 41 or 42 upon which it is centered. The seats are delimited at the interior of the bottom 37 or 38 by an inner peripheral face 45 or 46, which forms a cylinder of revolution about the axis 41 or 42 with a diameter less by some hundreds of a millimeter than the diameters $D_4$ or $D_5$ of the exterior peripheral face 20 or 21 of the percussion cap 18 or 19, to receive the cap and immobilize it by friction in a position in which its axis 21 or 22 coincides with the axis 41 or 42 of the cartridge case, and by a bottom plane face 47 or 48, oriented transversely with respect to the axis 41 or 42, following which its opens in such face. Conforming to non-limiting illustrative examples, an opening 49 or 50 placing the seat 35 or 36 in communication with the volume 41 or 42 is provided in the interior of the catridge case to receive a charge of powder. The dimensions of the peripheral face 45 or 46 of the seat 35 or 36 parallel to the axis 41 or 42 of the cartridge case are, in comparison with the dimensions of the percussion cap 18 or 19 parallel to its axis 22 or 23, such that the percussion cap may be introduced in its seat 35 or 36, said face 29 or 30 being turned toward the face 47 or 48, until the bottom face 26 or 27 lies level with the face 43 or 44 of the bottom 37 or 38 of the cartridge case in being by preference placed spaced from such face 43 or 44 by a distance $\epsilon$ (FIG. 15) generally but not exclusively on the order of a tenth of a millimeter, which constitutes the positioning of the cartridge cases upon their issuance from the apparatus which is now to be described.

By preference, the apparatus is fed and operated in a continuously moving manner, as in the illustrated example, or it is integrated with a manufacturing chain or train in continuous motion.

Referring now to FIGS. 3 and 4, which illustrate a particular part of such chain, one sees at 53 a drum for the placement of percussion caps in cartridge cases presenting a vertical axis 54 around which the drum is driven in rotation in the direction indicated by the curved arrow 55 by a suitable driving means (not shown) known to those skilled in the art, such drum presenting an external periphery 56 along which there are disposed percussion cap assembling stations 57 each of which presents a vertical axis proper 58, parallel to the axis 54. The different axes 58 are uniformly spaced angularly on the drum about the axis 54 and placed at a uniform radial distance from it, in a manner to be described, the drum 53 rotating in the direction 55 around the axis 54, thus describing a surface of revolution 59 coaxial with the axis 54.

The details of an assembling station 57 are more particularly shown in FIGS. 11–13, incl., in which the same reference characters are employed to designate the same elements as in preceding figures, even though they are placed on mechanisms occupying different positions depending in the different stages of assembly of the percussion cap upon the cartridge case.

It can be seen from FIGS. 11, 12 and 13 that the drum 53 has the form of a casing, the external periphery 56 of which is in generally the form of a body of revolution around the axis 54, drum 53 having an interior periphery 60, also in the form of a surface of revolution around axis 54; the casing is mounted upon a vertical shaft 62 having an external periphery 61, shaft 62 being also a body of revolution around the axis 54 of shaft 62, which is fixed with respect to the base of a frame. The mounting of the internal periphery 60 of the drum 53 upon the external periphery 61 of the shaft 62 is assured by various bearing means (not shown) known to those skilled in the art, assuring a possibility of relative rotation of the drum 53 around the axis 54, as well as supporting the drum 53 against motion in a downward direction parallel to the axis 54, with respect to the shaft 62.

At each of the assembly stations 57, all of which are identical, the external periphery 56 of the drum 53 carries fixed thereto a support block 63 which projects therefrom in a direction radially away from the axis 54, said block 63 itself carrying in a fixed manner in its upper part a plate 64 presenting an upper plane face 65, perpendicular to the axis 54, that is to say horizontal.

Said plate 64 has a vertical bore 66 therein receiving a sleeve 67, the bore 66 and the sleeve 67 being of circular cylinder shape and having a common vertical axis 58 parallel to the axis 54, axis 58 being the vertical axis of the assembly station 57. The diameter of the bore 66 is less than the diameter $D_6$ of the external peripheral face 5 of the body 1 of a vehicle and at least equal to the diameter $D_2$ of the interior peripheral face 4 of the body 1, so that a vehicle, designated as a whole by the reference character 68, can be disposed on the upper face 65 of the plate 64 in a position such that the common axes 3 and 8 coincide with the axis 58, and that the face 65 confronts the annular faces, for example face 7, of the body 2 without the risk of the slipping or gliding of the lining 2 of the vehicle 68 downwardly, in the direction of the axis 58.

In order to define such position of a vehicle 68 upon the plate 64, the block support 63 carries equally, in a solid manner, above the face 65 of the plate 64, a positioning block 69 integrally situated between the cylinder 59 and the axis 54 and presenting immediately above the face 65 a receptacle 70 opened from above in the direction of the axis 54. Such receptacle 70 presents, between the face 65 and a horizontal level disposed above it, a distance thereof equal to the height of the body 1, measured along the axis 58, that is to say with the length $L_2$ (FIG. 1), at least one abutment surface for the external peripheral surface 5 of the body 1; in the illustrative example, there are thus provided two abutment surfaces 71 and 72 (FIG. 12) with respect to which the remainder of the receptacle 70 is disposed toward the axis 54. Said abutment surfaces 71 and 72 are placed respectively in the immediate proximity of the upper face 65 of the plate 64, which defines for the receptacle 70 a lower face, and in the immediate proximity of the prescribed level, in order to serve as an abutment for the peripheral annular face 5 of the body 1 respectively at its lower and its upper part, and presenting the form of a part of a cylinder of revolution around the axis 58 having a diameter equal to the diameter $D_6$, and an angular development, in reference to the axis 58, less than 180° but by preference also as near as possible to such value and related by preference symmetrically with respect to one part and the other to a radial axial plane 73 including the axes 54 and 58 (the plane of FIGS. 12 and 13, defined by line XII—XII in FIG. 11).

To furnish a lower support for both the lining 2 of the vehicle 68 and for a percussion cap, for example 19, placed in the space 17 of the lining in a position in which its axis 23 coincides with the congruent axes 8, 7, and 58, the block support 63 carries, for this purpose, below the plate 64, a lower punch 74 having an upper end portion 67 of reduced diameter and a guide 75 therefor, both being in the shape of bodies of revolution coaxial about the axis 58, and extending into a central opening in the sleeve 66, with which it is coaxial, in the plate 64.

The lower punch 74 is adapted to remain fixed with respect to the support block 63, that is to say with respect to the drum 53, in a position in which it presents an upper face 76 in the form of a flat disc transverse with respect to the axis 58, with a diameter at most equal to the diameter $D_3$ (FIG. 2) of the lower peripheral face 9 of the lining 2, coplanar with the face 65 in such manner as to retain the percussion cap 19, by the lower face 27 thereof in contact with said face 76 at the upper end of the lower punch 74, the punch 74 remaining with its upper face 76 coplanar with the face 65 during the whole of the time in which the percussion cap is being affixed to the cartridge casing.

However, for reasons of security, the punch 74 is elastically yieldable downwardly with respect to such upper position thereof; to permit this, it is disposed in its lower part in a support guide 175 mounted for gliding along the axis 58 in the block support 63 and its lower end 77 is supported upon a yieldable pellet 78 which rests upon the bottom 176 of a counterbore 177 of the guide 175. The lower end 178 of the guide 175 rests upon a hydraulic cushion 80 of known type carried by the drum 53. Advantageously, the punch 74 is made solid with the supporting guide 175 by any appropriate means, for example, as is illustrated by a set screw 88 screwed into the guide sleeve 175 and extending into the seat 177 perpendicular to the axis 58 so as to engage into a groove 82 which the punch 74 presents parallel to the axis 58 in the proximity of its lower end 77 and which presents advantageously, in view of the support by the preset screw 88, a bottom which is oblique with respect to the axis 58, becoming deeper in an upward direction. Such system can be replaced by any other system permitting a downward yielding of the punch 74 with respect to its upper preferred position in which the upper face 76 is coplanar with the face 65 of the plate 74, and adapted to thrust the punch 74 yieldably upwardly into the above-described coplanar position thereof.

In its zone nearest to its upper end defined by the face 76, and at a height at least equal to $L_1+\epsilon$ measured with respect to such upper face 76, the punch 74 is delimited by an external peripheral face 83 forming a cylinder of revolution around the axis 58 with a diameter at most equal to the diameter $D_3$ of the peripheral interior face 9 of the lining 2.

Notably around such peripheral face 83, the punch 74 is surrounded by the guide 74, mounted for sliding following the axis 58 with respect to the punch 74 as well as with respect to the support block 63 with a traverse at least equal to $L_1+\epsilon$, starting from an upper position in which it presents an upper annular face 84 coplanar with the face 65, face 84 lying in a plane and being a surface of revolution around the axis 58 to which it is disposed perpendicular, such face 84 presenting an interior diameter equal to the diameter of the peripheral external face 83 of the punch 74 and an external diameter at least equal to the diameter of the peripheral face 67 of the passage 66.

The interior periphery of the upper annular face 84 of the guide 75 is defined by the intersection of such face with an interior peripheral face 85 thereof, and forms a surface of revolution about the axis 58 with a shape compatible with that of the lower punch 74, also a surface of revolution around the axis 58, in order to permit a downward yielding travel of the guide 75. The external periphery of the face 84 is such that it defines by its junction within the peripheral external face 86 of the guide 75 a surface of revolution around the axis 58 with a diameter at most equal to that of the peripheral face 67 of the passage 66 at a height, measured parallel to the axis 58, at least equal to the thickness of the plate 64 and measured in a similar manner at the periphery of the passage 66.

By preference, the interior diameter of the face 84 and the external diameter of the face 83, or diameter of the upper face 76 of the punch 74, are also as near as possible to the diameter $D_3$ of the interior peripheral face 9 of the lining 2 or the diameter $D_5$ of the percussion cap 19, and the diameter of the face 86 of the guide or the exterior diameter of the annular face 84 as the diameter of the face 67 of the passage 66 are also as near as possible to the diameter $D_1$ or of the diameter $D_2$, provided that the diameter of the faces 76 and 80 remain at most equal to the diameter $D_3$ and the diameter of the face 67 at least equal to the diameter $D_1$, in such manner as to permit a yielding of the lining 2 in the downward direction, with respect to the body 1 which is retained by the upper face 65 of the plate 64 and with respect to the percussion cap 19 retained by the upper face 76 of the punch 74, permitting the downward yielding of the guide 75 as will be described below.

In practice, the height of the face 86 is greater than the height of the plate 64, and is measured between the face 84 and an annular upper plane face 87 in the form of a surface of revolution around the axis 58, which the guide 75 presents in projection in the direction of a prolongation with respect to the axis 58 with respect to the peripheral external face 86. The upper position of the guide 75, corresponding to the coplanar condition of the faces 84 and 65, is defined by the emergence of the face 87 in abutting against the lower face 89 of the plate 64, around the passage 66, by the intermediary of an interchangeable spacing washer 88 which permits the appropriate adjustment of the parts so far as the vertical spacing thereof is concerned.

The annular face 87 is joined at its external periphery to an external peripheral face 90, which forms a cylinder of revolution around the axis 58, with a diameter greater than that of the face 86, the face 90 being that against which the guide 75 is in gliding contact, in a gliding or sliding relationship following the axis 58, with an interior peripheral face 91 complementary to a zone of the block support 63 intermediate between its upper part carrying the plate 64 and its lower part receiving and guiding the supporting guide 175. In such intermediate part, the slider 75 presents a lower end face 92, which is annular and plane, and forms a surface of revolution around the axis 58 to which its plane lies perpendicular, and the sliding support 175 which is elastically retractable in a downward direction, along the axis 58, carries fixed with respect thereto a ring 79 presenting an upper annular face 93 lying in a plane disposed transversely to the axis 58 to which it lies perpendicular, which is disposed beneath the face 92 at a distance (FIG. 12) measured parallel to the axis 58 when the guide 75 occupies its upper position in which its upper end 84 is coplanar with the face 65, equal to the distance $L_1 + \epsilon$ in such manner as to permit the retraction of the guide 75 downwardly with respect to such upper position through a distance which is such as to bring it into the position shown in FIG. 13 wherein the lower end face 92 of the guide 75 abuts the upper face 93 of the ring 79. Between such face 93 and an annular plane face 94 which is a surface of revolution around the axis 58 with respect to which it is perpendicular, which the member 75 presents interiorally, toward the downward direction, immediately beneath the surface 87, there is interposed a coil compression spring 95 disposed in a space formed between the guide 75 and the punch 74. The spring 95 constantly yieldably urges the guide 75 toward its upper position wherein the faces 84 and 65 lie coplanar.

The yielding retraction of the guide 75 from its upper position, shown in FIG. 12, toward its lower position, shown in FIG. 13, is caused by the intermediary of the lining 2 of the vehicle 68 and by the intermediary of a cartridge case such as shown at 40 in FIG. 19 held thereabove by means which will now be described.

In the illustrative example of the apparatus, such means comprises upon the positioning block 69, above the space 70 adapted to receive the vehicle 78, a second space or seat 96 adapted to receive a cartridge case 40 in a position in which its axis 42 coincides with the axis 58 and in which the lower face 44 of its flanged end 38 rests upon the upper annular end surface 11 of the lining 2 of vehicle 68, surface 11 being coplanar with the upper annular face 6 of the body 1, the guide 75 being then in its upper position, as shown in FIG. 12. It is to be noted that, in order to permit the yielding of the guide 75 in a downward direction by movement of the cartridge case 40 downwardly through the intermediary of the lining 2, the vehicle 68 is chosen in such manner that the diameter $D_2$ is at least equal to the maximum external diameter of the zone of the cartridge case 40 disposed at a height $L_2$ measured with respect to the face 44 parallel to its axis 42. By preference, these diameters are substantially equal, whereby to provide a guiding of the zone of the cartridge case 40 near its face by the peripheral interior surface 4 of the body 1, with a coincidence exactly as possible of the axis 42 of the cartridge case 40 with the axis 3 of the body 1, which occurs since the cartridge case 40, pressing the lining 2 and the guide 74 downwardly, penetrates into the interior of the body 1, which particularly assures the coincidence of the axis 2 of the seat 36 of the cartridge case 40 with the axis 8 of the lining 2 with which, as has been pointed out above, the axis 23 of the percussion cap 19 coincides.

More generally, notably in areas other than the mounting of percussion caps in cartridge cases, every time that it is necessary to introduce, according to the invention, a piece in a seat, along a predetermined axis, of an object presenting in the zone thereof near the seat an external envelope, formed by predetermined generatrices parallel to such axis, while utilizing a vehicle of the type generally described above, comprising a lining presenting a peripheral interior face defining an opening or space of constant section transversely with respect to a rectilinear axis and an external periphery in gliding contact with the interior periphery of a body, in order to permit a relative parallel translation of the lining with respect to the body along such axis, there is given to the interior periphery of the body a transverse section with respect to the axis of the complementary space of the section of the exterior envelope of the object in the zone near the seat, taken transversely with respect to the axis of the seat, in such manner that the progressive introduction of the object into the interior of the body, which accompanies the expression or escape of the lining out of the body, causes a placing in a coincidence as exact as possible of the axis of the seat and the axis of the space or passage, and a relative angular positioning also as precise as possible, considered in reference to such coincident axes. The external periphery of the lining 2 will naturally present equally in this case a section, taken transversely with respect to the axis of the passage or space, which is complementary to that of the interior periphery of the body 1 in order also to maintain between them an angular positioning which is relatively precise, with respect to the their respective coincident axes.

In this case, the body 1 will present an external periphery in a form different from a form of revolution around the axis of the space in the lining 2 and it is necessary to orient the object so that it is complementary to the seat to which it is to be applied; however, there will be employed the same supporting complementary surfaces provided on the positioning block 69 as well as for the object which is to be applied to the seat in the body.

When on the other hand, the object is a body of revolution around an axis, as is the case with the cartridge case 40 illustrated herein, orientation means for the cartridge case and the percussion cap are not necessary and the seat 96 presents, in view of the support of the cartridge case 40 in the direction of alignment vis-a-vis the axis 54, at least one, and in practice two supporting surfaces of revolution around the axis 58, with an angular development at least equal to 180°, with in the illustrative example symmetry of each of such surfaces with respect to plane 73, naturally the seat 96 is integrally situated inwardly toward the axis 54 with respect to such surface or such supporting surfaces.

In the illustrative example, there is thus provided a lower supporting surface 97 situated at an intermediate level above that of the upper supporting surface 72 of the seat 70 and connected to such surface 72 by a horizontal face 98, which is disposed in a plane oriented transversely with respect to the axis 58 and situated at a distance from the face 65, above and with respect to it, substantially equal to the height $L_2$ of the body 1 the upper annular face 6 of which is disposed immediately beneath such face 98 when the other end face 70 is disposed upon face 65 and the axis 3 of which coincides with axis 58. It is in effect to be recalled that the diameter of the face 97, complementary to that of the cartridge case 40 in the immediate proximity of the face 44 of the flange thereof, is less than that of the face 72 of a diameter substantially equal to the diameter $D_6$. There is incidentally provided an upper supporting face 99 having a form complementary to that of the cartridge case 40 presenting a zone 100 near its flange, that is to say the form of a portion of surface of revolution of which the lower part is a cylinder of revolution around the axis 58 with a diameter near to that of the face 97, of which the upper part is also a cylinder of revolution around the axis 58 with a smaller diameter, adapted to that of the flange of the cartridge case, and of which the intermediate part presents a frusto-conical shape of revolution around the axis 58 which converges in an upward direction, so that the supporting face 99, as well as the supporting surface 97, does not constitute an obstacle to the movement of the cartridge case 40 downwardly with respect to its position in which its face 44 is coplanar with the face 6 of the body 1 of the vehicle 68 resting by its face 7 upon the face 65 of the plate 64.

Above the position thus defined for the cartridge case 40 there is disposed, along the axis 58, an upper punch 101 proper, disposed for reciprocation along the axis 58, to penetrate into the interior of the cartridge case 40 through the flange thereof in order to present a thrust or support in a downward direction, of the interior of the cartridge case, upon the flange thereof and to cause a movement of the cartridge case, of the lining 2 of the vehicle 68 and of the guide 75 downwardly from the upper positions thereof, shown in FIG. 12, corresponding to the coincidence of the annular face 84 of the guide 75 with the face 65 of the plate 64.

To achieve this result, the upper punch 101, presenting for example many successive sections of different diameters increasing in an upward direction in the form of cylinders of revolution around the axis 58, is carried by a mandrel 102 itself carried by the lower end of a plunger 104 guided for reciprocation along the axis 58, by means of which are familiar to those skilled in the art, in a radial protuberance 103 of the drum 53, a protuberance in which the plunger 104 is reciprocably mounted. As shown in FIG. 14, the plunger 104 carries a lower roller 105 and an upper roller 106, mounted for rotation around the respective horizontal axes 107 and 108, and disposed radially outwardly with respect to the axis 54 in a vertical plane containing the axis 54. Rollers 105 and 106 constitute cam followers engaging respectively the lower surface 109 of the cam 111 and the upper surface 110 thereof. As we have seen above, the cam forms a part of a member 113 which is fixedly attached to the non-rotatable main vertical shaft 61. It will thus be apparent that as the drum 53 rotates, it carries with it the plungers 104 which are caused to reciprocate vertically as the cam following rollers 105 and 106, mounted in a body fixedly connected to the plunger 104, travel about the cam 111.

The lower and upper faces 109, 110 of the cam 111 are parallel; the development of such cam faces, extending through 360°, is shown in FIG. 15 where it is designated 116. The cam presents a cam path which is annular and continuous, disposed canted with respect to the axis 54, and is mounted upon a body having an exterior 112, body 112 being in the form of a cylinder of revolution around axis 54, the body 113 being fixedly connected to shaft 62, as above explained.

The respective left and right halves of FIG. 14 show the path of the cam in the highest zone thereof, corresponding to the height $h_1$ in FIG. 15, and the lowest level thereof shown at $h_4$ in FIG. 15. The high point of the cam 111 corresponds to the position of the parts at the precussion cap assembly station 50 as they are in position in FIG. 12 and in the position of such parts at such station shown in FIG. 13. As stated above, FIG. 15 illustrates the development of the cam of the path in a plane which follows that of the rollers 105 and 106, the axes 107 and 108 of which are fixed with respect to the shaft 104 and as a consequence in respect to the upper punch 101. The cam 111 operating with the cam followers 105 and 106 cause the lower end 114 of the upper punch 101 to described the path 116, shown as a phantom line in FIG. 15, to described the path thereshown such path being in the form of a disc in a plane perpendicular to the axis 58 of the punch 101, and more precisely at the intersection of the lower end 114 thereof with the axis 58.

The path 116 of the lower end 114 of the upper punch 101, shown in FIG. 15, may be considered as an integral part of the description of the apparatus of the invention. The abcissa of such figure shows the progressive angular positions occupied by the axis 58 with reference to the axis 54, measured in the direction of rotation 55 of the drum 53 with respect to an origin (a radial line) shown at Ox in FIG. 3, corresponding to the descent of the lower end 114 of the punch 101 for the percussion cap with respect to the extreme upper position thereof; the ordinate of FIG. 15 indicates the level of the lower end 114 of the punch 101, measured vertically by reference to the upper face 65 of the plate 64.

FIG. 15 shows the variation in position of the lower end 114 of the upper punch 101 throughout a 360° rotation of the drum 53 counterclockwise as shown in FIG. 3 from the starting position Ox. It can be seen in FIG. 15 that the lower end 114 of punch 101 from alpha=0, at the left in FIG. 15 until the position alpha=247.5° near the right in FIG. 15 the position of the lower end 114 of the upper punch 101 is changing substantially continually with the exception of the intermediate region of 10.5°. Beyond the position alpha=247.5° $h_1$ remains constant until the value 360° is reached, at which point the cycle starts over again, that is, alpha again equals zero. The feeding of the seat or receptacle 70 and of the seat or receptacle 96, respectively, in vehicles of which the lining 2 carries internally a percussion cap such as 19 and is integrally situated in the interior of the body 1 and in cartridge cases such as 40 carries out at the beginning of the cycle by means of a transfer wheel 117 (FIGS. 3 and 4) whereby the cartridge cases 40 now provided with a percussion ca 19, the vehicles 68 now being empty, and the lining 2 thereof being integrally situated in the interior of the body at the end of the cycle are taken up by a second transfer wheel 118 (FIGS. 3 and 4).

The angular spacing between successive stations 57 on drum 53, where a percussion cap is applied to a cartridge case, with respect to the origin Ox are shown in FIG. 3.

Initially, when the station 57 is located at Ox, the lower face 114 of the upper punch 101 is situated at a level small $h_1$ with respect to the upper face 65 at the sum of $L_1$ and of $L_3$, where $L_3$ is the length of the cartridge case 40 measured parallel to its axis 42. For the cartridge case 40, the vehicle 68 and the percussion cap 19 in the course of passage of the transfer wheel 117 to the corresponding seats or receptacles 70 and 96 of the assembling station 57, this corresponds to a coincidence of the end faces 7 and 12, in a direction downwardly, of the body 1 and the lining 2, and of the bottom face 27 of the percussion cap 19 with the level of the face 65 upon which it glides or slips progressively following a radial direction with respect to the axis 54, and in the rest position of the cartridge case 40 by its face 44 upon the end face 11 of the lining 2, then coplanar with the face 6 of the body 1, the axes 8, 3, 23, 42 being then coincident; as the rotation of the drum 53 procedes, the coincident axes come into coincidence with the axis 58 and transfers it by the transfer wheel 117, to maintain respectively the vehicle 68 by its body 1 and the cartridge case 40 in a position against the respective supporting surfaces 71, 72 and 97, 99 of the seats 70 and 96, the respective faces 119 and 120, of revolution around the axis 54, the guiding guards 121, 122 disposed about the assembly drum 53 over a maximum angle ($\alpha$) alpha, between the transfer wheels 117 and 118, the face 119 of the guard 121 presenting the form of a cylinder of revolution around the axis 54, with a diameter equal to the diameter of the first cylinder 59 augmented by the diameter $D_6$ of the external peripheral face 5 of the body 1, and the face 120 presents a form with respect to that of the cartridge case 40 to serve as a centrifugal support for it during the rotation of the drum. If the cartridge case 40 presents its zone most nearly to the face 44 a generally cylindrical envelope of revolution around the axis 42, the face 120 presents itself the form of a body of revolution around the axis 54 with a diameter equal to the sum of the diameter of the first cylinder 59 and of that of the zone of the cartridge case.

If, to the contrary, the cartridge case 40 presents in the proximity of the face 44 a peripheral envelope generally conical in form around its axis 42, the face 120 is in the form of a truncated cone of revolution about the axis 54, with the same conicity, and with respective larger and smaller diameters easily determined by one skilled in the art as a function of the diameter of the peripheral cylinder 59 and the corresponding diameters of the conical envelope of the cartridge case 40. The lower end face 114 of the upper punch 101 then is at an intermediate level between the level $h_1$ and the sum $L_1+L_3$, and the body 1 then rests by its face 7 upon the upper face 65 of the plate 64 around the passage 66 thereof, the lining 2, on the face 11 of which the cartridge case 40 rests by its face 40, rests by its face 12 upon the annular extremity 84 of the guide 75 which is then coplanar with the face 65, and the percussion cap 19 rests by its face 27 upon the upper face 76 of the lower punch 74. In other words, the faces 7, 12, 27 are at the level O and the face 44 is at the level $L_1$, which is the same as level $L_2$.

When, finally, the rotation of the station 57 in the direction 55 continues, the face 114 of the upper punch 101 not having ceased to descend, at a point 60° displaced from the origin Ox, to a level $h_2=L_1$ augmented by L4, where L4 designates the distance taken parallel to the axis 52 separating the face 44 of the cartridge case 40 and the face 115 thereof, such level being a plane and oriented transversely with respect to the axis 42, and delimiting the interior volume 52 of the cartridge case 40 toward the face 44 thereof. The vehicle 68, the percussion cap, and the cartridge case 40 occupy the position described.

It is to be noted that, when the face 114 reaches the height or level h2, its speed of descent pratically ceases, taking into account the fact that the drum 53 is rotating continually, at a constant angular speed, whereby it enters without jarring into contact with the face 115 of the cartridge case 40, naturally the external diameter of the upper punch 101 is chosen so as to be compatible at the time with the penetration into the interior of the cartridge case 40 by the collet or flange thereof and with a support of the face 114 against the face 115 around the opening 50 in the cartridge case 40.

The movement of descent of the upper punch 101 continues at an increased speed up to the faces 114 and 115 at the level h3 substantially equal to L4 augmented by the height $L_5$ of the percurssion cap 19 measured parallel to the axis 23 thereof between its faces 27 and 30. As shown in FIG. 15, this face of descent of the upper punch 101 is accompanied by a penetration into the cartridge case 40, through its neighboring zones of the face 44, by the interior of the body 1 of which the peripheral internal face 4 assures if need be a placing in precise coincidence the axis 42 with the axis 3 with which the axis 4 coincides and itself coincides with the axis 23 of the percussion cap 19, and of a descent of the lining 2 following the coincident axes 3 and 8 at the interior of the body 1. In such movement, the lining 2 rests so that it is supported by its face 12 upon the upper face 82 of the guide 75, which retreats downwardly while causing a compression of the coil compression spring 95 whereby, at least in an accidental jamming in the opening 17, provoking the retraction of the lower punch 74 by reason the hydraulic cushion 80, by the intermediary of the guide 175, the percussion cap 19 remains stationary, supported by its face 27 against the upper face 76 of the lower punch 74. It is to be noted that this immobility of the percussion cap, around which the lining 2 progressively descends, does not constitute merely a variant of the known means of extraction of a piece from a channel of a vehicle by deplacing the piece with respect to the vehicle which is maintained fixed, and presents the advantage, by reason of a fixed support of the percussion cap, or more generally the piece, of avoiding all vibration of it and all tipping of it with respect to the space or channel therewithin which otherwise would be sources of jams.

At the end of this stage, the faces 114 and 115 occupy the height h3, the face 44 of the cartridge case 40 occupies a level $L_5$, that is to say coincide with the face 30 of the percussion cap 19, the same as the face 11 of the lining 2, of which the face 12 finds itself with its annular face 84 of the guide 75 at a height $L_5$ less $L_1$ beneath the face 65. The face 27 of the percussion cap 19 and the face 7 of the body 1 rest together at their original height.

The passage of the level h2 to the level h3 is effected at the additional rotation of 38° of the assembly station 57 under consideration.

In the course of the following stage, the upper punch 101 continues its descent, at a reduced speed in the zone where such descent is accompanied by the introduction, under force, of the percussion cap 19 in its seat 36 of the cartridge case 40 until the face 27 has been placed in abutment against the face 44 through a distance $\epsilon$ previously defined, which corresponds substantially to an excess of the depth $L_6$ of the seat 36, that is to say of the height of the face 46 measured parallel to the axis 42, with respect to the overall height $L_5$ of the percussion cap 19. In 30° of rotation of the assembly station 47, such movement leads the faces 114 and 115 to a height $h4=L4-\epsilon$ which corresponds for the face 44 of the cartridge case 40 and for the face 11 of the lining 2, at which it rests joined, to the level $-\epsilon$, that is to say slightly below the face 65 of the plate 64 defining the level 0 of the face 7 of the body 1 joined to such face 65, and the faces 27 of the percussion cap 19 and 76 of the lower punch 74 in intimate contact at said zero level, then the face 12 of the lining 2 and the face 84 of the guide 76, themselves also in intimate contact, find themselves at the level $-(L_1+\epsilon)$, beneath the face 65.

It is to be noted that, in the case of excessive resistance to the penetration of the percussion cap 19 into its seat 36 of the cartridge case 40 at this stage, the lower punch can retract downwardly because of the hydraulic cushion 80 in order to permit a retraction of the percussion cap in a downward direction as a counterpart of the dicent of the upper punch 101.

It should also be noted that, in the course of the two stages above described, the cartridge case 40 is progressively substituted for the lining 2 in the interior of the body 1 of the vehicle 68, but it only when the face 114 of the upper punch exceeds a height $h4+\epsilon$ that the lining 2 becomes entirely disengaged from the body 1. In particular, immediately before the introduction of the percussion cap 19 into its seat 36 and during such introdution, the cartridge case 40 by its gflange 44 and the lining 2 are conjointly engaged in the body 1, which maintains them in precise alignment and assures the introduction of the percussion cap into the seat under the best possible conditions.

The assembly station 57 maintains such state during a subsequent 1.5° of rotation, then the upper punch 101 describes a lifting movement which, through 48 further degrees of rotation of the station 57, leads the lower face 114 to a height h5 identical with the level h2, the spring 95 causing a return movement of the guide 75 in an upward direction, while maintaining by the lining 2 contact of the face 115 of the cartridge case 40 with the face 114 of the upper punch 101, until the face 84 is at the coplanar level with the face 65, which restores the lining 2 to its fully inserted position in the body 1, in which condition the faces 12 and 7 are coplanar as well as the faces 11 and 6, and also leading the face 44 of the cartridge case 40 to the level $L_1$. The percussion cap 19 immobilized by friction in its seat 36 in the position in which its face 27 is spaced by the value $\epsilon$ with respect to the face 44 of the cartridge case 40 stops in the face of the movement of the upper face 76 of the lower punch 74, and its face 27 finds itself at the end of such stage at the level $L_1+\epsilon$. The body 1 of the vehicle then rests immobilized with respect to a vertical movement by the face 98 delimiting the upper limits of the seat 70.

In a last phase, the upper punch 101 continues its rising movement through 60° rotation of the station 57, so that it is progressively withdrawn from the interior 52 of the cartridge case 40 and leads the lower end of the upper punch 101 to the initial level h1, while the cartridge case 40 continues to rest by its lower face 44 upon the face 11 of the lining 2 maintained coplanar with the face 6 of the body 1 by contact of the face 12 against the face 84 of the guide 75 which is then coplanar with the face 65 of the plate 64.

Until again reaching the original position defined by the line Ox, the upper punch 101 keeps the same position relative to the face 65 of the plate 64.

As soon as the upper punch 101 has moved away sufficiently from the cartridge case 40 in order to liberate the latter in a radial direction with respect to the axis 54, that is to say in practice as soon as the lower face 114 attains a level equal to $L_1+L_3$ with respect to the face 65, the cartridge case 40 now provided with its percussion cap 19 and the vehicle 68 having moved back to its original state of coincidence of the faces 12 and 7 and the faces 11 and 6 being able to be discharged radially by the discharge transfer roll 118 according to a process which is the reverse of that of their radial introduction by the infeeding transfer wheel 117, the guiding guards 121 and 122 being interrupted for this purpose in the zones in which respectively the first cylinder 59 of the percussion cap assembling drum 53 is tangent to a first cylinder 123 of the transfer roll 117, which is in the form of a cylinder of revolution about an axis 124 parallel to the axis 54 and around which the transfer roll 117 is driven in rotation in the direction 125 which is opposite the direction 55, and to a first cylinder 126 of the first transfer wheel 118, which is a cylinder of revolution around an axis 127 parallel to the axis 54 and around which the transfer wheel 118 is driven for rotation in a direction 128 identical with direction 125, the respective diameters of the overall or peripheral cylinders 123 and 126 are equal to that of peripheral cylinder 59, and the respective angular speeds of rotation of wheels 117 and 118 and of the drum 53 are identical.

It is to be noted that the zones in which the peripheral cylinder 59 of the drum 53 is tangent to the peripheral cylinder 123 of the transfer wheel 117 and to the peripheral cylinder 126 of the transfer wheel 118 are disposed in the interior of an angular sector alpha, respectively, in the proximity of the axis Ox and in the proximity of an axis Oy displaced angularly through an angle alpha with reference to the axis 159 and in the direction 55, with respect to the axis Ox.

Turning now first to FIGS. 3, 5 and 6 and then particularly to FIGS. 7 and 8, it can be seen that the transfer wheel 117 (FIGS. 3, 5 and 6) presents an exterior periphery 129 which is a cylindrical cylinder of revolution around the axis 124 with the same diameter as its peripheral cylinder 123, and in which there are arranged lower seats 130 and upper seats 131, open in a radial direction with respect to the axis 124, and presenting supporting surfaces toward it respectively, for a vehicle 68 of which the lining 2 is integrally disposed in the interior of the body 1 and for a cartridge case 40, in a position of the vehicle and of said cartridge case such that their respective axes are coincident in an axis 132 disposed on the peripheral cylinder 123; the pairs of coaxial seats 130-131 are spaced angularly along the length of the peripheral cylinder 123 in a uniform manner, and are present in the same number as the percussion cap assembling stations 57 of the drum 53, that is to say a number of eight in the non-limiting illustrative example.

It is the same for the transfer wheel 118, of which the respective axes of the respective upper and lower seats, disposed to receive respectively a cartridge case and a vehicle in which there is integrally mounted a lining 2 disposed in the body 1, regularly spaced angularly along the length of the peripheral cylinder 126 in a number identical to that of the percussion cap assembling stations 57 of the drum 53.

The respective upper seats such as 131 of the transfer wheels 117, 118 are thus adapted respectively to feed the upper seats 96 of the drum 53 with cartridge cases 40 which are to receive a percussion cap fed thereto by an operating drum 230, and to effect the reception in the seats 96 of cartridge cases which have received a percussion cap, to transfer them to another operating drum 231.

There is also similarly assured the coaxial superposition of a cartridge case 40 to be provided with a percussion cap and a vehicle 68 of which the lining 2 is integrally assembled in the interior of the body 1 and carries internally thereof a percussion cap 90, and the separation of the cartridge case 40 which has been provided with a percussion cap with respect to the vehicle 68 from which a percussion cap has been fed, cooperating with a third transfer wheel 232 of which two details are illustrated in FIGS. 6 and 10, and which present a base cylinder 233 with an axis 234 parallel to the axes 124 and 127, with a direction of rotation 235 around such axis identical with the direction 55; the base cylinder 233 presents a diameter equal to that of the base cylinders 123 and 126 to which it is tangent, and along the length of such base cylinder there are regularly spaced seats 236 adapted to cooperate respectively with the lower seats 130 of the transfer wheel 127 and with the lower seats of the transfer wheel 118 in order to respectively, feed the transfer wheel 117 and empty the transfer wheel 118; the number of seats 236 is identical to that of the assembling stations 57 of the drum 53, and the angular speed of rotation of the transfer wheel 232 is identical to that of the drum 57.

The transfer wheel 232 is itself fed under the same conditions by a transfer wheel 133 and emptied by a transfer wheel 134, such last wheel feeding a drum 135 for feeding the percussion cap holding vehicles 68, conforming to the disclosure of French Pat. No. 82 00801 of Jan. 20, 1982, which feeds a transfer wheel 136 which itself feeds a control drum 137 playing the role of a wheel for transferring members from the wheel 136 to the wheel 133.

The above referred-to Greslin et al application describes in detail the drum 135, the transfer wheels 232, 133, 134, 136, and the drum 137 in accordance with a technique well-known to those skilled in the art.

It is to be recalled simply that the transfer wheels 232, 133, 134, 136, and the drums 135, and 137, in referring to FIG. 5 which shows a part of drum 137, transport vehicles 68 each composed of a body 1 in which a lining 2 is disposed, in open seats following a radially centrifugal direction which assuring the coplanarity of the faces 7 and 12 with the upper face 65 of the plate 64 of each assembly station 57, by contact in a downward direction between a plane coplanar face with such face 65, designated by the reference character 138 and rotative in that it concerns the drum 137 (FIG. 5) and designated by the reference 139 and fixed insofar as it concerns the transfer wheel 232 (FIGS. 6 and 8); to perform in the same manner a similar role for the transfer of vehicles 68 between the wheel 232 and the drum 53, the transfer wheels 117 and 118 are similarly provided with such supporting faces in a downward direction, which are plane and coplanar with the face 65 and which are designated by the reference character 140, in FIG. 8, the fixed face playing such role in the transfer wheel 117.

After the successive passage by the vehicles 68 by the wheel 136, the drum 137, the wheels 138, 232, 117, such supporting faces of the vehicle in a downward direction similarly maintain the percussion cap 19 in the space 17 of the lining 2, in furnishing such face 27 in a support in the downward direction.

The cartridge cases 40, since they are retained against a downward movement until contact is established between the respective basic cylinders 123 and 233 of the transfer wheels 117 and 232 lead them on the vehicles 68 (FIGS. 8 and 9) and after they have ceased to rest upon such vehicles by the ceasation of contact between the basic cylinders 126 and 233 the transfer wheels 118 and 232, by plane faces, situated at a level $L_1$ or $L_2$ above the face 65 parallel thereto, the face playing such role in the case of the transfer wheel 117 having been designated by the reference character 141 in FIG. 7.

Finally, in a manner known per se, the fixed guiding guards present toward the respective axis of the drums and the transfer wheels respectively supporting faces for the cartridge cases (face 152 insofar as it concerns the transfer wheel 117) and the vehicles (face 143 insofar as it concerns the transfer wheel 117, 144) and 244 (insofar as it concerns the transfer wheel 232), and 145 (insofar as it concerns the drum 137) preventing the cartridge cases and the vehicles from leaving the respective seats by centrifugal movement outside the zones of transfer between wheels, or between wheels and drums; said guiding guards have been designated by the reference characters 146 to 153 insofar as they are concerned respectively with the transfer wheel 118, the trunk of the transfer wheel 232 joining the wheel 118 to the transfer wheel 134, said transfer wheel 134, the drum 135, the transfer wheel 136, the drum 137, the transfer drum 133, the part of the transfer wheel 232 joining the wheel 133 to the transfer wheel 117, and such transfer wheel 117. There is thus defined the path of circulation designated respectively by the reference characters 154 and 155 in FIG. 4, for the vehicles 68 and for the cartridge cases 40, with a conjoint trajectory of the entry into contact of the respective basic cylinders 233 and 133 of the transfer wheels 232 and 117 at the entry into contact of the transfer wheels 118 and 232 (taking into account their respective directions of rotation).

Naturally, other paths of circulation, corresponding to different conceptions of the drums, the transfer wheels, and the guiding guards, may be chosen by one skilled in the art without having departed from the framework of the present invention.

It is to be noted that the utilization, for treating different calibers of ammunition, of vehicles of which the respective bodies present respective external sides $L_2$ and $D_6$ which are identical prevent the need for changing the guiding guards and an adjustment of the relative level of the superimposed seats upon the transfer wheels 117 and 118 and upon the assembly stations 57 of the drum 53 when the caliber of the ammunition being treated is changed.

In each case, the utilization of a double vehicle serving as a surface for supporting the cartridge case permits feeding to and a discharge from the assembling drum without risks, since the continuous reunion and separation of the respective path of circulation 154 and 155 of the vehicles and the cartridge cases, in a natural and rapid fashion, without recourse to complicated feeding systems but by the simple play of guiding guards judiciously disposed respectively on one part or the other of the paths of circulation, as is known to one skilled in the art; it is to be noted that according to another variant, unillustrated, of carrying out the invention, the respective bodies of the vehicles may be connected in twos around axes parallel to each other, generally parallel to a preferred orientation which one desires to give to the respective axes of the internal channels or spaces of the linings of the vehicles, in order to form a chain of vehicles allowing the ommision of guiding guards while retaining all the advantages of the conception of the vehicles in accordance with the invention.

At the time of the assembly of the percussion cap into the seat in the cartridge case the composite vehicle compels a simple and reproducible centering of the percussion cap with respect to the cartridge case, permitting a rapid cadence of assembly to be maintained in spite of the close adjustment which must necessarily be maintained in such assembly operation.

This if facilitated by the fact that, at the time of such application of a percussion cap to a cartridge case, the unstable and dangerous element which constitutes the percussion cap remains fixed, since the only element which is moved is that which is more stable, which is not dangerous, that is to say the cartridge case. In fact, the assembly of the percussion cap into the cartridge case does not require a single movement in the lower part of the drum 53, other than the movement of the eventual movement of the hydraulic security system 80.

In a general manner, such advantages reappear every time that one utilizes a vehicle conforming to that of the present invention, notably in the framework of a method which is analogous to that above described, to introduce every piece other than a percussion cap in a complementary seat provided in an object other than a cartridge case, and one will not depart from the body of the present invention in providing a vehicle, a method, and an apparatus, which has been above described, including the modifications and adaptations thereof applied to pieces and objects which may be different from percussion caps and cartridge cases.

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. In a method of introducing a workpiece into a seat of an object by means of a multi-part vehicle adapted to receive a workpiece therewithin to facilitate the manipulation thereof, comprising at least one tubular lining having a peripheral interior face defining a workpiece receiving space therewithin and a peripheral external face of constant transverse section, and a body in which the lining is mounted for reciprocation along the common axis of the lining and body whereby the lining can be moved from an initial position with respect to the body during the manipulation operation, and can be restored to its initial position with respect to the body following such manipulation, the body presenting an internal peripheral face of constant transverse section which is complementary to the exterior peripheral face of the lining, the lining and body being of equal length so that in one relative position thereof the respective end faces of the body and the lining are coplanar, the seat presenting a predetermined axis and the object presenting, in its zone near the seat an external envelope formed of generatrices parallel to said predetermined axis of the seat, the improvement comprising introducing and retaining the workpiece in the space within the vehicle, coupling the vehicle and the object into a relative position in which the respective axes of the seat and of the space within the lining of the vehicle coincide and in which the seat faces the space, transferring the workpiece from the space to the seat by a relative translation of the workpiece and the space along the common axis thereof, and to separate the vehicle and the object, the body of the vehicle presenting a peripheral interior face of which the section transverse to the axis thereof is complementary to said envelope of the object and, after having introduced the workpiece into the space within the lining of the vehicle, the vehicle and the object are coupled in said relative position by the lining of the vehicle in its said initial position, effecting the transfer of a part while causing a translation of the body with respect to the lining with the lining coupled to the object, to envelope the same by means of the body while allowing it also to engage upon the lining (operation a) and then pushing the workpiece until it goes into the seat (operation b), and thereafter causing the return of the vehicle to the initial position thereof before separating the object therefrom.

2. A method according to claim 1, wherein the workpiece is retained in the space of the vehicle in the proximity of one of the ends thereof, and in that the lining of the vehicle and the object are coupled in the proximity of the other end of the space within the lining of the vehicle.

3. A method according to claim 2, wherein operations a and b are carried out simultaneously.

4. A method according to claim 3, wherein operations a and b are practices while retaining the body of the vehicle and the workpiece so as to permit a relative movement in opposite directions therebetween along the common axis of the vehicle and the space therewithin and in pushing the lining with respect to the body and the workpiece along such axis by a thrust applied through the intermediary of the object which one introduces into the body of the vehicle which is thus held by a relative translation along said axis until the seat receives the workpiece.

5. Apparatus for introducing a workpiece into a seat of an object comprising a work station, means on the work station to receive an object and a vehicle comprising an outer body and a lining therefor in the form of a tube mounting for sliding within the body, the body and lining being initially disposed relative to each other in a predetermined position; the lining having a space therewithin in which a workpiece is retained and means to carry out the transfer of the workpiece from the space within the lining of the vehicle to a seat in the object by the translation of the workpiece in the lining of the vehicle along the axis of the vehicle, wherein the means to effect such transfer comprises means to apply opposing thrusts along the axis of the space within the lining of the vehicle on the one hand to the object and the lining of the vehicle and on the other hand to the body of the vehicle and the workpiece, in the direction of introduction of the object into the body of the vehicle and of the workpiece into the seat of the object from the beginning initial position of the parts of the vehicle and of the workpiece within the lining of the vehicle and later on to return the body and the lining of the vehicle to their initial relative positions.

6. Apparatus according to claim 5, for practicing the method according to claim 1, wherein the means to effect the transfer of the workpiece from the vehicle to the seat in the object comprises means for retaining the body of the vehicle and the workpiece and to cause them to move relative to each other in a movement along the axis of the space within the lining of the vehicle, and means means for translating the body and the lining of the vehicle in a first direction relative to each other and then translating the body and the lining in the reverse direction relative to each other.

7. Apparatus according to claim 6, wherein the work station comprises a seat having at least an upper face which faces downwardly and a lower face which faces upwardly, said faces being complementary to at least one part of the end faces of the body of the vehicle, and a peripheral internal face having a vertical axis complementary to at least a part of the external peripheral face of the body of the vehicle to receive and immobilize the body in a position in which the axis of the space within the lining of the vehicle coincides with said vertical axis of the peripheral internal face of the seat to permit a vertical movement therebetween, a lower punch fixed with respect to the seat and presenting an upper horizontal face at a level with the lower face of the seat to serve as a support for the workpiece, and a peripheral external face adjacent to said upper end face and presenting transversely to the vertical axis of the seat a constant section identical to that of the interior peripheral face of the lining of the vehicle, a guide presenting an annular upper horizontal face complementary to the lower end face of the lining of the vehicle to serve as a support therefor, the guide being mounted for vertical gliding around the peripheral external face of the lower punch between an upper position in which the upper face is coplanar with the lower face of the seat and a lower position in which its upper face is situated below said lower face through a distance equal to the length of the lining of the vehicle, and yieldable means returning the guide from its lower position to its upper position, the means for receiving an object in a position in which it reposes upon the lower face around the seat upon the upper face of the guide by the intermediary of said lining, and presenting the axis of the seat along said vertical axis and envelopes the same in the vertical direct prolongation of the peripheral exterior face of the lining of the vehicle, and an upper thrusting means disposed according to said vertical axis above the lower punch and movable vertically with respect thereto to impel the object in a vertical movement from an upper position in which its lower face is coplanar with the upper face of the seat to a lower position in which such lower face is approximately coplanar with the lower face of the seat, especially beneath such last face, and causing a return movement of the object from the lower to the upper position thereof.

8. Apparatus according to claim 7, comprising a plurality of work stations spaced along the periphery of an operating drum turning around a vertical axis, the drum being fed and served with vehicles and objects by a continuously moving chain.

9. Apparatus according to claim 8, wherein the said vertical movement of the upper thrusting punch at each work station is driven by rollers traveling along the path of a cam as they travel in rotation with the operating drum.

10. A multi-part vehicle adapted to receive a workpiece therewithin to facilitate the manipulation thereof, comprising at least one lining defining a workpiece receiving space therewithin, and a body in which the lining is mounted for reciprocation along the common axis of the lining and body, whereby the lining can be moved from an initial position with respect to the body during the manipulation operation, and can be restored to its initial position with respect to the body following such manipulation, and wherein the said lining is tubular and has a peripheral interior face defining the space therewithin, and a peripheral external face of constant transverse section, and the body presents an internal peripheral face of constant transverse section which is complementary to the exterior peripheral face of the lining, the lining and body being of equal length so that in one relative position thereof the respective end faces of the body and lining are coplanar, and wherein said interior peripheral face and exterior peripheral face of the lining are cylinders of revolution around the axis of the lining, and the interior peripheral face of the body is a cylinder of revolution, and further wherein at least one of the engaging interior peripheral face of the body, and the exterior peripheral face of the lining has a helicoidal groove therein.

* * * * *